United States Patent
Van Der Eerden et al.

(10) Patent No.: US 11,053,087 B2
(45) Date of Patent: Jul. 6, 2021

(54) DEVICE AND METHOD FOR REMOVING FOOD PRODUCTS FROM A BELT CONVEYOR

(71) Applicant: MAREL STORK POULTRY PROCESSING B.V., Boxmeer (NL)

(72) Inventors: Henricus Franciscus Jacobus Maria Van Der Eerden, Boxmeer (NL); Johannes Petrus Leonardus Knippenbergh, Boxmeer (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 16/627,462

(22) PCT Filed: Jun. 14, 2018

(86) PCT No.: PCT/NL2018/050387
§ 371 (c)(1),
(2) Date: Dec. 30, 2019

(87) PCT Pub. No.: WO2019/004817
PCT Pub. Date: Jan. 3, 2019

(65) Prior Publication Data
US 2021/0070553 A1    Mar. 11, 2021

(30) Foreign Application Priority Data

Jun. 29, 2017 (NL) ...................................... 2019142

(51) Int. Cl.
*B65G 47/82* (2006.01)
*B65G 45/14* (2006.01)

(52) U.S. Cl.
CPC ............. *B65G 47/82* (2013.01); *B65G 45/14* (2013.01); *B65G 2201/0202* (2013.01)

(58) Field of Classification Search
CPC ........ B65G 45/10; B65G 45/14; B65G 45/16; B65G 45/18; B65G 47/82; B65G 2201/0202
(Continued)

(56) References Cited

U.S. PATENT DOCUMENTS 1,239,066 A * 9/1917 Winters ................. B65G 45/14
198/498
2,801,733 A * 8/1957 Evert .................... B65G 39/073
198/498

(Continued)

FOREIGN PATENT DOCUMENTS

WO        2006008621 A1    1/2006

OTHER PUBLICATIONS

Netherlands Search Report and Written Opinion from NL Application No. NL 2019142, dated Mar. 5, 2018.

(Continued)

*Primary Examiner* — Mark A Deuble
(74) *Attorney, Agent, or Firm* — Workman Nydegger

(57) ABSTRACT

The present invention related to a method and a device for removing food products from a belt conveyor, comprising a belt conveyor comprising two ends, an endless belt and a drive, for transporting food products on the endless belt from a feed location towards a discharge location, wherein the endless belt comprises a transporting side and a returning side; a removing device for removing food products from the endless belt, comprising: a roller, facing the returning side of the endless belt, wherein the roller is arranged at a predetermined distance from the endless belt; and a frame part, for holding the roller at the predetermined distance; wherein the endless belt is configured to rotate in a first direction and wherein the roller is configured to rotate in the same direction as the endless belt.

21 Claims, 6 Drawing Sheets

(58) Field of Classification Search
USPC .............................. 198/370.08–370.09, 498
See application file for complete search history.

(56) References Cited

U.S. PATENT DOCUMENTS

| | | | | |
|---|---|---|---|---|
| 3,161,285 A * | 12/1964 | Hummer | ................ | B65G 45/20 |
| | | | | 198/498 |
| 3,430,758 A * | 3/1969 | Searles | ................ | B65G 39/073 |
| | | | | 198/498 |
| 3,983,888 A * | 10/1976 | Edwards | ................ | B65G 45/18 |
| | | | | 134/9 |
| 4,356,906 A * | 11/1982 | Fallas | ................ | B65B 35/20 |
| | | | | 198/413 |
| 4,907,690 A * | 3/1990 | Spohn | ................ | B65G 45/14 |
| | | | | 198/498 |
| 5,161,666 A * | 11/1992 | Pope | ................ | B65G 45/20 |
| | | | | 198/496 |
| 5,497,872 A * | 3/1996 | Pennino | ................ | B65G 39/073 |
| | | | | 198/496 |
| 5,657,853 A * | 8/1997 | Pennino | ................ | B65G 39/073 |
| | | | | 15/256.52 |
| 6,533,102 B2 * | 3/2003 | Franzoni | ................ | B65G 45/14 |
| | | | | 198/495 |
| 9,138,781 B1 | 9/2015 | Strong et al. | | |
| 2003/0183483 A1 * | 10/2003 | Rennie | ................ | B65G 47/30 |
| | | | | 198/370.08 |
| 2005/0247544 A1 * | 11/2005 | Chesack | ................ | B65G 33/26 |
| | | | | 198/657 |

OTHER PUBLICATIONS

International Search Report and Written Opinion from PCT Application No. PCT/NL2018/050387, dated Sep. 13, 2018.

* cited by examiner

DEVICE AND METHOD FOR REMOVING FOOD PRODUCTS FROM A BELT CONVEYOR

BACKGROUND

The present invention relates to a device and method for removing food products from a belt conveyor.

Removing food products from belt conveyors is presenting a difficulty in food production lines, in particular from a homogenous belt where it is very difficult to press a scraper against the carrying surface of the belt for removing food products or residue from the belt. Often the belt has traverse ribs for propulsion of the belt and relatively soft belt segments there between cause the belt to sag somewhat between the ribs, making it difficult to remove products from the sagging belt.

Traditional scrapers used to remove food products from belts also remove at least some of the residue from the belt surface, especially when used on modular belts which have a stiffer structure enabling the scraper to be pressed against the belt. Even when a scraper is used for a homogenous belt, a large portion of the residue is also removed together with the products. The residue is of little or no value and should preferably be discarded and not contaminate the products.

Further, traditional scrapers not only remove residue from the belt, they also remove primary products simultaneously with secondary products, necessitating a sorting process downstream of the scraper.

It is therefore an object of the present invention to provide an improved device and method for removing food products from a belt conveyor. It is a further object of the present invention to provide an improved device and method for separating different food products transported on a belt conveyor.

For this purpose, the invention proposes a device for removing food products from a belt conveyor, comprising a belt conveyor comprising two ends, an endless belt and a drive, for transporting food products on the endless belt from a feed location towards a discharge location, wherein the endless belt comprises a transporting side and a returning side; a removing device for removing food products from the endless belt, comprising: a roller, facing the returning side of the endless belt, wherein the roller is arranged at a predetermined distance from the endless belt; and a frame part, for holding the roller at the predetermined distance; wherein the endless belt is configured to rotate in a first rotational direction and wherein the roller is configured to rotate in the same rotational direction as the endless belt.

SUMMARY

The belt conveyor, wherein the belt is typically looped around the ends, or end rollers, and wherein the belt is driven by the drive, may for instance be loaded, or fed on a first side, and discharged at a second end. At the discharge end, primary food products on the belt reach the end at a certain speed, and fall off the belt due to the speed and lack of support of the endless belt at the second end. However, food products which stick to the endless belt to at least some extent do not automatically fall off the endless conveyor. The sticking secondary food products can be removed with the removing device, wherein the roller is rotated and grips the secondary food products still sticking to the conveyor belt. The roller, which is facing the returning side of the endless belt, is thus located on the bottom half of the conveyor belt, or facing the bottom part of the conveyor belt.

When the conveyor belt rotates, for instance clockwise, the upper part, or the transport side, of the belt conveyor moves towards the right, and the bottom part, or the returning side, moves towards the left. By rotating the roller in the same direction as the belt, for instance both clockwise, and by arranging the roller at the returning side of the belt conveyor, the part of the roller that may come in contact with the secondary food product is locally moved in a direction opposite to the transporting direction of the secondary food products sticking to the conveyor, which facilitates removal of the sticking secondary food products. A drive according to the invention may be anything that drives the belt conveyor, so any means to make the endless belt move in transport direction, for example an electronic motor.

In for instance an elongated belt conveyor, the transport side of the belt may be considered as the upper half of the belt, or the part above a centre line between the ends, for instance end rollers, and the return side may be the bottom half, or the part below a centre line between the ends, for instance formed by end rollers.

The removing device may be arranged at the location of the end, such as the end roller, of the belt conveyor at the discharge location. The discharge location of the belt conveyor is typically the end of the belt conveyor in transport direction. The removing device may thus be located relatively close to the discharge location, and is typically located just below the discharge location. Having the removing device relatively close to the discharge location makes that discharge of food products from the conveyor, either due to removal with the removing device or due to the speed of the food products and the end of the belt conveyor, occurs substantially in the same area.

At the discharge location, the endless belt may substantially U-shaped, wherein one of the legs of the U is part of the transporting side, the other leg of the U may be part of the returning side, and the roller of the removing device may face the rounded part of the U adjacent the leg of the returning side. A U-shape allows for a smooth transition from transport to return side, and a controlled discharge of primary food product from the conveyor.

Alternatively, at the discharge location, the endless belt may substantially V-shaped, wherein one of the legs of the V is part of the transporting side, and the other leg of the V may be part of the returning side. The roller of the removing device may face the returning side of the V-shape. A V-shape allows for a relative sharp transition from transport to return side, which increases the amount of discharge of primary food product from the conveyor. Such sharp transition may be of particular use when relatively sticky products are to be discharged from the conveyor.

The roller may be arranged downstream of the discharge location, such that the removing of secondary food product with the roller may occur after typical discharging of primary food products. With downstream according to the invention is meant further away from the discharge location, wherein upstream would be at, or closer to, the feeding location where food products are loaded or placed on the belt.

The belt conveyor may comprise a turning point, where the endless belt changes from transporting to returning, wherein the roller may be arranged downstream of this turning point. The turning point may for instance be the centre of the U of a U-shaped belt, or may for instance be at the level of the centre of the belt conveyor, for instance at a level of a line connecting the ends, such as the end rollers, of the belt conveyor.

The roller of the removing device may be elongated, and comprises a plurality of circumferential grooves, spaced apart in longitudinal direction of the roller. Grooves in the roller may reduce the contact surface of the roller and the food products that are to be removed from the endless belt. The circumferential grooves may have a depth of between 2 and 4 mm, in particular about 3 mm. Such depths of grooves prove particularly effective in practise, to remove sufficient amounts of product from the endless belt. The grooves may have a width of between 2 and 4 mm, in particular about 3 mm. The grooves may be spaced apart between 2 and 4 mm, in particular 3 mm, in axial direction of the roller.

The roller of the removing device may be elongated and comprise at least one thread, in particular a helical thread or a screw thread, along the circumference of the roller. The thread may have a lead, or pitch, between 4 and 8 mm, in particular about 6 mm. The thread may have the same depth as the grooves described above. The thread of the roller forces secondary food products to be removed from the roller and/or the endless belt to one end of the roller. At that end, the secondary food products and material accumulate, and fall of the roller naturally, facilitating removal of products from the roller.

The removing device may further comprise a cam with a plurality of protrusions, which protrusions are substantially complementary with the circumferential grooves of the roller, wherein the protrusions preferably taper toward their free ends. The cam with the protrusions preferably comprises the same number of protrusions compared to the number of circumferential grooves in the roller, or within two. The protrusions, which may run in the grooves, may be used to remove or force the sticking food products from the roller. In an embodiment, the protrusions extend at least partly into the circumferential grooves of the roller, such that the protrusions, or the tapered ends thereof, may be used to remove any food products that stick to the roller. Alternatively, the removing device may comprise a cam with a helical protrusion, substantially complementary to the thread of the roller of the removing device, wherein the helical protrusion has substantially the same lead, or pitch, compared to the thread of the roller. Alternatively, the removing device may comprise a stationary blade, preferably from a flexible material, used to scrap off or slide off food products that stick to the roller. Alternatively the removing device may comprise a simple second roller used to remove the said food products.

The device may further comprise a cleaning station, arranged downstream of the removing device, for cleaning the endless belt after food products passed the removing device. Any food residue, for instance sticking to the belt, which is not removed from the endless belt by the removing device and/or the roller, may be removed from the endless belt with the cleaning station, such that when the endless belt returns to the feeding location the belt is clean again.

The device may further comprise a primary food products receiver, for receiving primary food products from the discharge location; and a secondary food products receiver, for receiving secondary food products removed with the removing device, wherein the primary and secondary food products receivers are spaced apart. Two receivers allows to separate food products which fall of the belt conveyor naturally from food products which are removed from the endless belt with the removing device, in particular the roller thereof.

The drive of the belt conveyor may drive both the belt conveyor and the roller of the removing device. Especially given that the belt conveyor and the roller are rotated in the same direction, the same drive may be used without use of gears, which saves in the number of drives required to drive the device.

A part of the roller of the removing device facing the endless belt may be configured to move in an opposite direction compared to the endless belt at the part of the roller. The part of the roller facing the endless belt for instance is the part of the roller between the grooves, or the part of the roller closest to the belt. By moving in the opposite direction, the food product sticking onto the belt may be forced off the endless belt.

The predetermined distance between the roller and the endless belt may lie between 0.5 and 2 mm. The distance according to the invention is the distance between the outer part of the roller and the endless belt. The stated distance may allow residue and contamination on the belt to pass between the conveyor belt and the roller, but food products, which are to be removed with a device according to the invention may be removed using the roller of the removing device.

The invention further relates to a removing device for use in a device according to the invention, as well as a food production line, comprising a device according to the invention or a removing device according to the invention.

The invention further relates to a method for removing food products from a belt conveyor, in particular with a device according the invention, comprising the steps of: transporting food products on a belt conveyor in a transport direction, from a feed location towards a discharge location by rotating the belt conveyor in a first direction; rotating a removing device, at a predetermined distance from the end of the belt conveyor, in the same direction as the belt conveyor; and removing food product from the belt conveyor with the removing device. Such method generally has the same advantages compared to the device of the invention.

The method may further comprise the step of cleaning the removing device after food product is removed from the belt conveyor. Such cleaning of the removing device prevents undesired contamination or clogging of the removing device.

The food products may comprise different primary and secondary food products, wherein the primary food products are removed from the endless belt without a removing device, and are in particular dropped on a primary food products receiver; and wherein the secondary food products are removed from the endless belt by means of the removing device and are in particular dropped on a secondary food products receiver. Primary food products are for instance prime products, or the desired end products which fulfil all requirements. Secondary food products may for instance be smaller than the first food products. These secondary food products may for instance be stickier compared to the primary food products, and may tend to stick to the endless belt. Separating these primary and secondary food products into different receivers allows to separate the food products into their respective classes. Thereto, the primary food products may be removed from the belt at a first location, and the secondary food products may be removed from the belt at a second location, which first and second location are spaced apart in transport direction, wherein the second location is preferably located downstream of the first location.

The method may further comprise the step of cleaning the belt conveyor after removing the food products. This cleaning typically occurs after the food products are removed from the endless belt by the removing device. Any food residue, for instance sticking to the belt, which is not removed from the endless belt by the removing device and/or the roller, may be removed from the endless belt with the cleaning station, such that when the endless belt returns to the feeding location the belt is clean again.

The method may further include the step of setting the removing device at a predetermined distance from the end of the belt conveyor, wherein the predetermined distance in particular lies between 0.5 and 2 mm. Different kinds of food products may require different distances, wherein the distance in particular relates to the thickness of food products or residue on the endless belt which are not to be removed from the belt by means of the removing device, and thus are allowed to pass between a gap (or distance) between the belt and the removing device. These products, or residue, are typically of no interest and are removed or cleaned from the belt conveyor at a later stage, further downstream.

BRIEF DESCRIPTION OF THE DRAWINGS

The invention will be further elucidated herein below on the basis of the non-limitative exemplary embodiments shown in the following figures. Herein.

DETAILED DESCRIPTION OF VARIOUS EMBODIMENTS

Figure 1:
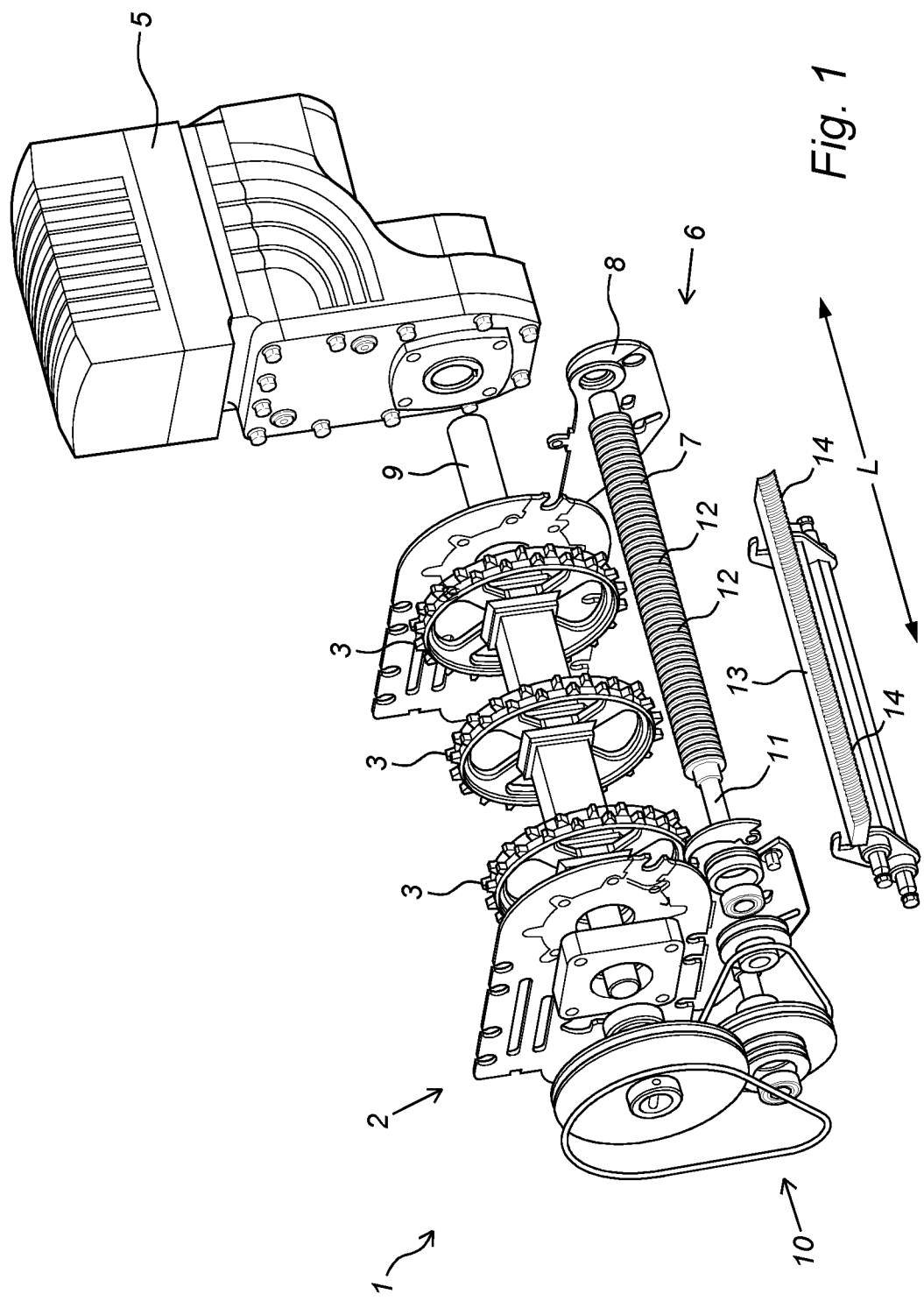
FIG. 1 schematically shows an exploded view of a device according to the invention, without an endless belt.

FIG. 1 schematically shows a device (1) for removing food products from a belt conveyor (2), comprising a belt conveyor (2) with end rollers (3), a (non-shown) endless belt (4) and a drive in form of an electronic motor (5). FIG. 1 further shows a removing device (6) for removing food products from the endless belt (4), comprising a roller (7) and a frame part (8), for holding the roller (7). The motor (5) drives the belt conveyor (2) through a central drive axis (9) wherein the end rollers (3) are driven, in particular rotated by the motor (5). Attached to the same drive axis (9) is a system (10) of pulleys and belts, which also drives the roller (7), which is provided on a roller drive axis (11).

FIG. 1 further shows that the roller (7) of the removing device (6) is elongated, and comprises a plurality of, preferably circumferential, grooves (12), spaced apart in longitudinal direction (L) of the roller (7). The removing device (6) is further provided with a cam (13) with a plurality of protrusions (14), which protrusions (14) are complementary with the grooves (12) of the roller (7), and taper toward their free ends.

In FIG. 1, the roller (7) is held by the frame part (8) on both sides of the roller (7), which forms a stable support for the roller (7). However, when for instance the grooves (12) in the roller (7) are embodied in a (non-shown variant of a) helical way, for instance as one treaded groove (12) along the circumference of the roller (7), products are forced or driven to one side of the roller (7). In FIG. 1, products are typically forced towards the non-driven side of the roller (7), in this case the side of the roller (7) closest to the motor (5), or right side of the roller (7). At that side of the roller (7), the roller (7) can also be unsupported by the frame part (8) but may be supported by an elongated co-axial rod instead. This rod could have a diameter smaller than the diameter of the roller (7), which facilitates removal of product from the roller (7).

Figure 2:
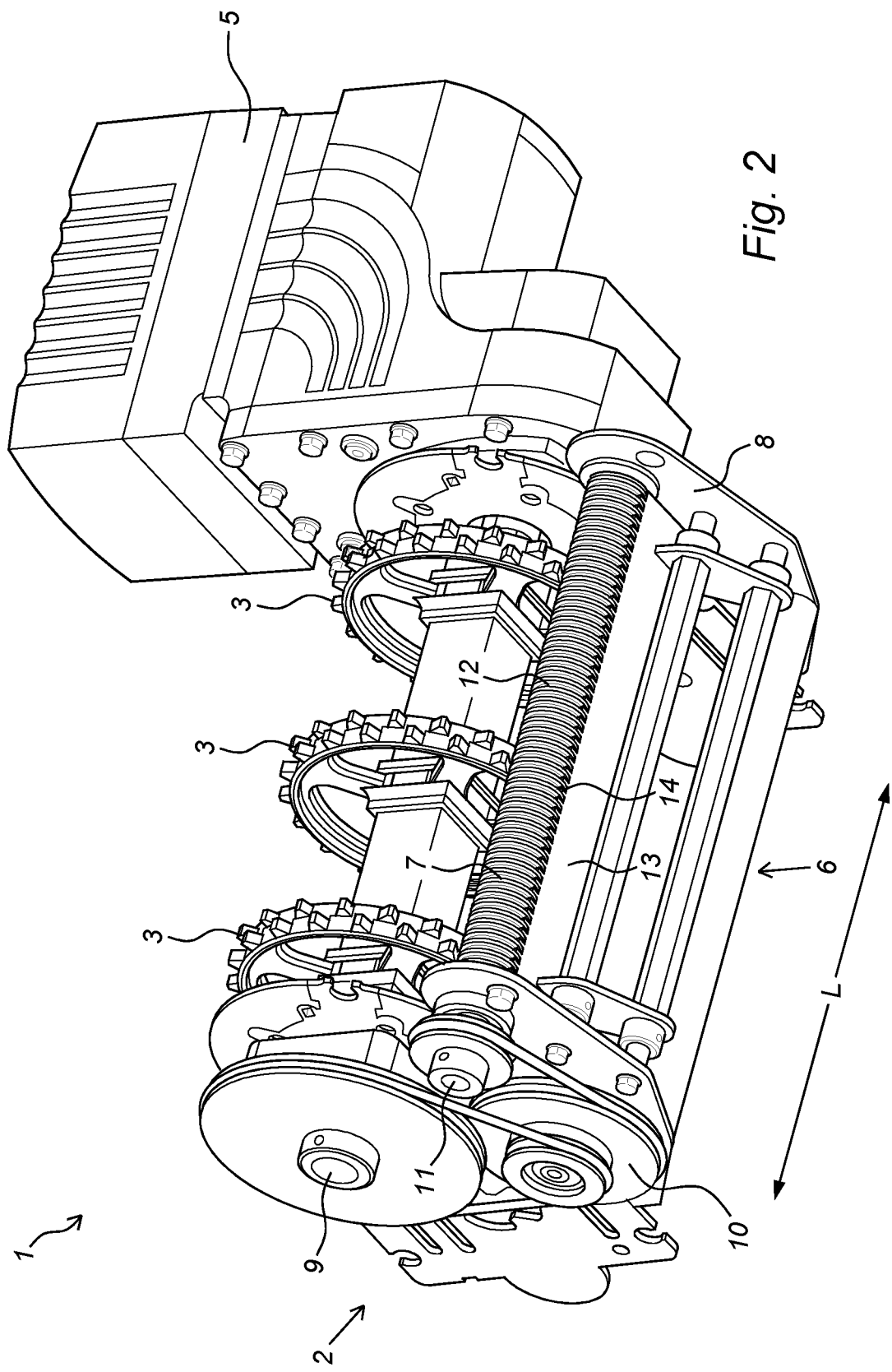
FIG. 2 shows the device of FIG. 1 in an unexploded view.

FIG. 2 shows the device (1) of FIG. 1, in an unexploded view.

Figure 3:
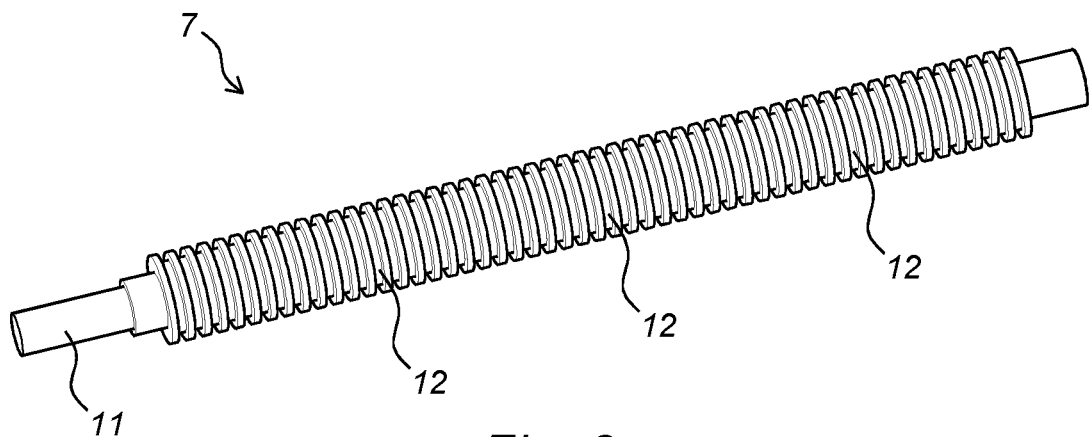
FIG. 3 shows a detailed view of a roller according to the present invention.
Figure 4:
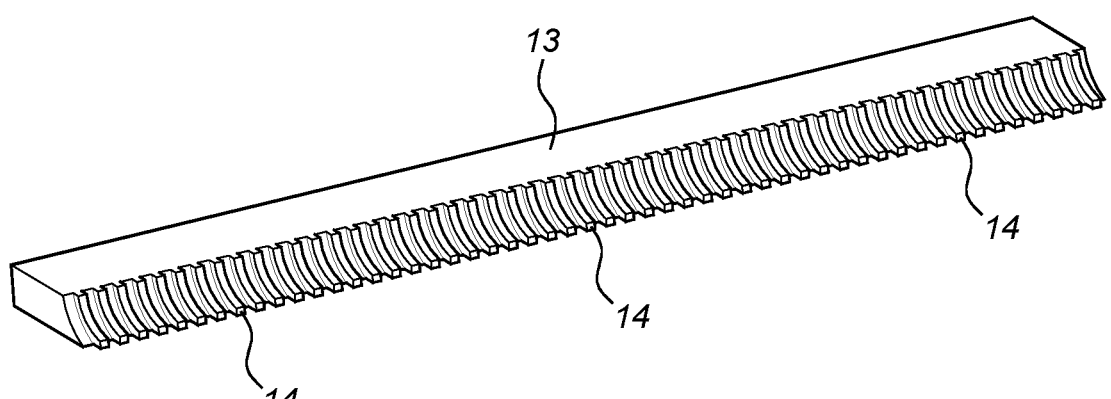
FIG. 4 shows a detailed view of a cam with protrusions according to the present invention.

FIG. 3 shows a detailed view of the roller (7) of FIGS. 1 and 2, and FIG. 4 shows a detailed view of a cam (13) with protrusions (14) according to FIGS. 1 and 2.

Figure 5:
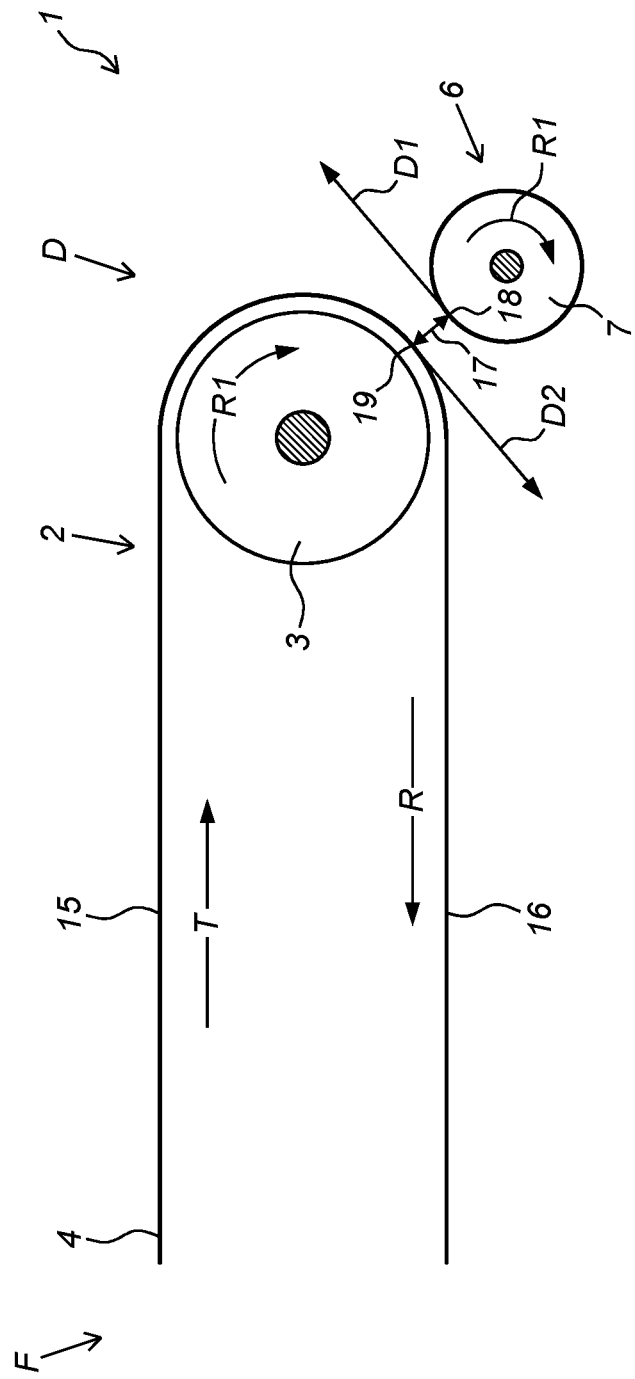
FIG. 5 schematically shows a device according to the invention.

FIG. 5 schematically shows a device (1) for removing food products from a belt conveyor (2), comprising a belt conveyor (2) with end rollers (3) and an endless belt (4), for transporting food products on the endless belt (4) from a feed location (F) towards a discharge location (D), wherein the endless belt (4) comprises a transporting side (15) and a returning side (16). The transport side (15) is the upper side of the belt (4), and the returning side (16) is the bottom side of the belt (4), after passing the end roller (3). The transporting side (15) generally moves in transport direction (T), and the returning side (16) generally moves in returning direction (R).

FIG. 5 further schematically shows a removing device (6) for removing food products from the endless belt (4), comprising a roller (7) facing the returning side (16) of the endless belt (4), wherein the roller (7) is arranged at a predetermined distance (17) from the endless belt (4). The endless belt (4) is configured to rotate in a first direction (R1) and the roller (7) is configured to rotate in the same direction (R1). The end rollers (3) typically also rotate in the first direction (R1).

Because the roller (7) faces the returning side (16) of the endless belt (4), locally the end (18) of the roller (7) and the closest part (19) of the endless belt (4) move in opposite directions (D1, D2).

Figure 6:
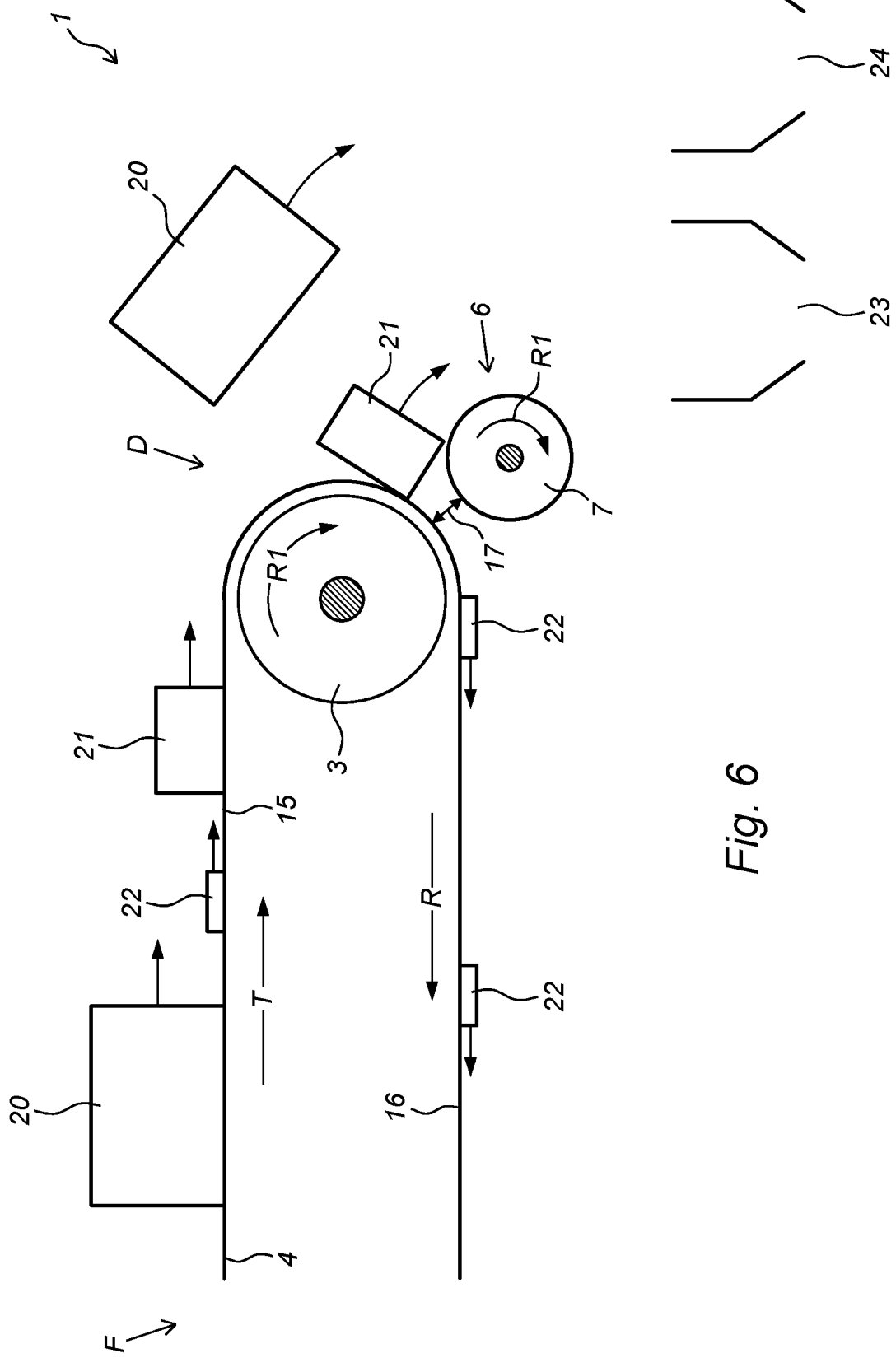
FIG. 6 schematically shows the device of FIG. 5, loaded with primary and secondary food products, as well as with residue.

FIG. 6 schematically shows the device (1) of FIG. 5, with primary (20) and secondary (21) food products, as well as with residue (22). The residue (22) is lower or smaller compared to the distance (17) between the endless belt (4) and the roller (7), and thus passes through the removing device (6). The primary food products (20) are the largest, and fall off the endless belt (4) at the discharge location (D). The secondary food products (21) stick to the endless belt (4), and do not fall off at the discharge location (D). However, the secondary food products (21) are too large to pass between the distance (17) between the endless belt (4) and the roller (7), and thus encounter the rotating roller (7) of the removing device (6). The roller (7) forces the secondary food products (21) off the conveyor belt (4) upon rotation, and propels the secondary food products (21) away from the conveyor (4). The primary (20) and secondary (21) food products may be received by primary (23) and secondary (24) receivers, such as bins or conveyor belts.

Figure 7:
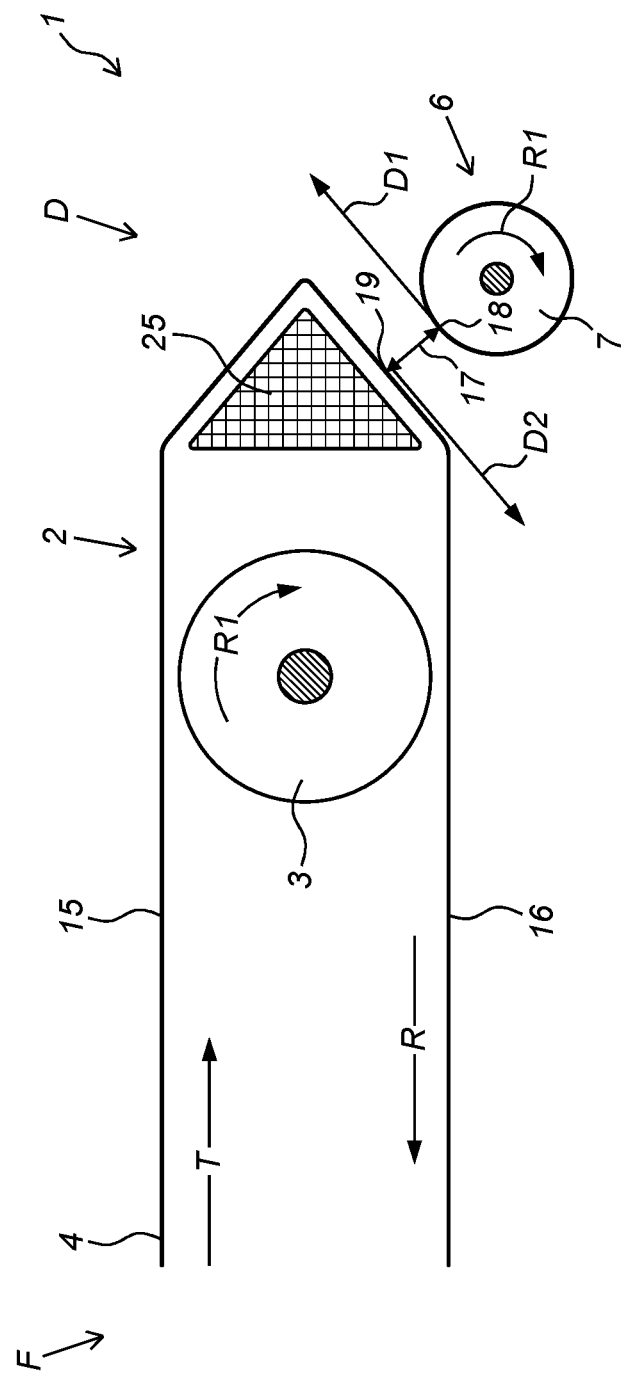
FIG. 7 schematically shows a device according to the invention in a variation on FIG. 5.

FIG. 7 schematically shows a device according to the invention in a variation on FIG. 5, wherein the same reference signs of FIG. 5 are used to indicated the same elements. FIG. 7 shows a variation wherein an insert (25) is used, with a triangular cross-section. The conveyor belt (4) is guided along this insert (25), such that a relative sharp, or V-shaped, end of the belt (4) is achieved, wherein at the sharp transition of the V-shape, product can be discharged easily from the belt (4). Such insert (25) is of particular help when relatively sticky products are transported on the belt (4).

The invention claimed is:
1. A device for removing food products from a belt conveyor, comprising:
   a) a belt conveyor comprising two ends, an endless belt and a drive, for transporting the food products on the endless belt from a feed location towards a discharge location, wherein the endless belt comprises a transporting side and a returning side;
   b) a removing device for removing the food products from the endless belt, comprising:
      i) a roller, facing the returning side of the endless belt, wherein the roller is arranged at a predetermined distance from the endless belt; and
      ii) a frame part for holding the roller at the predetermined distance;
   c) wherein the endless belt is configured to rotate in a first rotational direction and wherein the roller is configured to rotate in a same rotational direction as the first rotational direction of the endless belt;
wherein the roller of the removing device is elongated, and comprises a plurality of circumferential grooves, spaced apart in a longitudinal direction of the roller;
wherein the plurality of circumferential grooves have a depth of between 2 and 4 mm; and
wherein the plurality of circumferential grooves are spaced apart between 2 and 4 mm.

2. The device according to claim 1, wherein the removing device is arranged at a location of the end of the belt conveyor at the discharge location.

3. The device according to claim 1, wherein at the discharge location the endless belt is substantially U-shaped;
   wherein a first leg of the U-shape of the endless belt is part of the transporting side, a second leg of the U-shape of the endless belt is part of the returning side; and
   wherein the roller of the removing device faces a rounded part of the U-shape of the endless belt adjacent the second leg of the returning side.

4. The device according to claim 1, wherein at the discharge location the endless belt is substantially V-shaped;
   wherein a first leg of the V-shape of the endless belt is part of the transporting side, a second leg of the V-shape of the endless belt is part of the returning side; and
   wherein the roller of the removing device faces the returning side.

5. The device according to claim 1, wherein the roller is arranged downstream of the discharge location.

6. The device according to claim 1, wherein the belt conveyor comprises a turning point, where the endless belt changes from the transporting side to the returning side;
   wherein the roller is arranged downstream of the turning point.

7. The device according to claim 1, wherein the roller of the removing device is elongated, and comprises at least one thread, comprising a helical thread, along a circumference of the roller,
   wherein the at least one thread has a lead, or pitch, between 4 and 8 mm.

8. The device according to claim 1, wherein the removing device further comprises a cam with a plurality of protrusions, which protrusions are substantially complementary with the plurality of circumferential grooves of the roller;
   wherein the plurality of protrusions taper toward free ends thereof.

9. The device according to claim 1, comprising a cleaning station, arranged downstream of the removing device, for cleaning the endless belt after the food products have passed the removing device.

10. The device according to claim 1, comprising a primary food products receiver, for receiving primary food products from the discharge location; and a secondary food products receiver, for receiving secondary food products removed with the removing device;
   wherein the primary and secondary food products receivers are spaced apart.

11. The device according to claim 1, wherein the drive drives both the belt conveyor and the roller of the removing device.

12. The device according to claim 1, wherein a part of the roller of the removing device facing the endless belt is configured to move in an opposite direction compared to the endless belt at the part of the roller.

13. The device according to claim 1, wherein the predetermined distance lies between 0.5 and 2 mm.

14. A removing device for use in a device according to claim 1.

15. A food production line, comprising a device according to claim 1.

16. A method for removing food products from a belt conveyor, with a device comprising a belt conveyor comprising two ends, an endless belt and a drive, for transporting the food products on the endless belt from a feed location towards a discharge location, the endless belt comprising a transporting side and a returning side; and a removing device for removing the food products from the endless belt, the removing device comprising: a roller facing the returning side of the endless belt, the roller arranged at a predetermined distance from the endless belt and a frame part for holding the roller at the predetermined distance; the endless belt configured to rotate in a first rotational direction and the roller configured to rotate in a same rotational direction as the first rotational direction of the endless belt the method comprising the steps of:
   a) transporting the food products on the belt conveyor in a transport direction, from the feed location towards the discharge location by rotating the belt conveyor in the first direction;
   b) rotating the removing device, at the predetermined distance from the end of the belt conveyor, in the same rotational direction as the belt conveyor;
   c) removing the food products from the belt conveyor with the removing device;
wherein the food products comprise different primary and secondary food products;
wherein the primary food products are removed from the endless belt without the removing device, and are dropped on a primary food products receiver; and
wherein the secondary food products are removed from the endless belt by means of the removing device and are dropped on a secondary food products receiver.

17. The method according to claim 16, further comprising the step of cleaning the removing device after the food products have been removed from the belt conveyor.

18. The method according to claim 17, wherein the primary food products are removed from the endless belt at a first location; and
   wherein the secondary food products are removed from the endless belt at a second location, which first and second locations are spaced apart in the transport direction;

wherein the second location is located downstream of the first location.

19. The method according to claim 16, further comprising the step of cleaning the belt conveyor after removing the food products.

20. The method according to claim 16, including the step of setting the removing device at a predetermined distance from the end of the belt conveyor;
   wherein the predetermined distance lies between 0.5 and 2 mm.

21. A device for removing food products from a belt conveyor, comprising:
   a) a belt conveyor comprising two ends, an endless belt and a drive, for transporting the food products on the endless belt from a feed location towards a discharge location, wherein the endless belt comprises a transporting side and a returning side;
   b) a removing device for removing the food products from the endless belt, comprising:
      i) a roller, facing the returning side of the endless belt, wherein the roller is arranged at a predetermined distance from the endless belt; and
      ii) a frame part for holding the roller at the predetermined distance;
   c) wherein the endless belt is configured to rotate in a first rotational direction and wherein the roller is configured to rotate in a same rotational direction as the first rotational direction of the endless belt;
   d) wherein the roller of the removing device is elongated, and comprises at least one thread, comprising a helical thread, along a circumference of the roller, wherein the at least one thread has a lead, or pitch, between 4 and 8 mm.

* * * * *